Feb. 15, 1966     F. RANK     3,234,719
MULTI-CUTTER MOWER
Filed Oct. 2, 1964     3 Sheets-Sheet 1
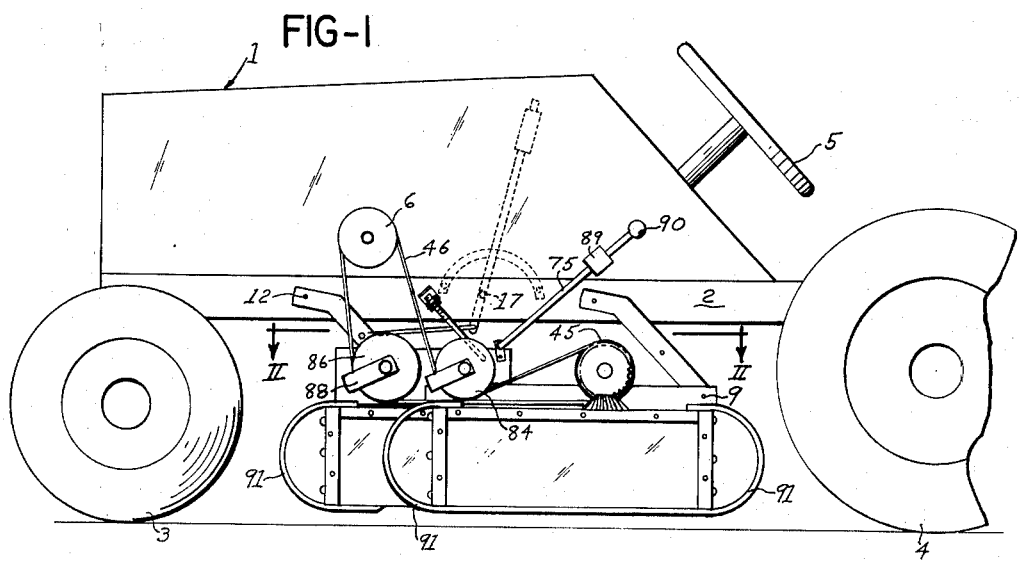
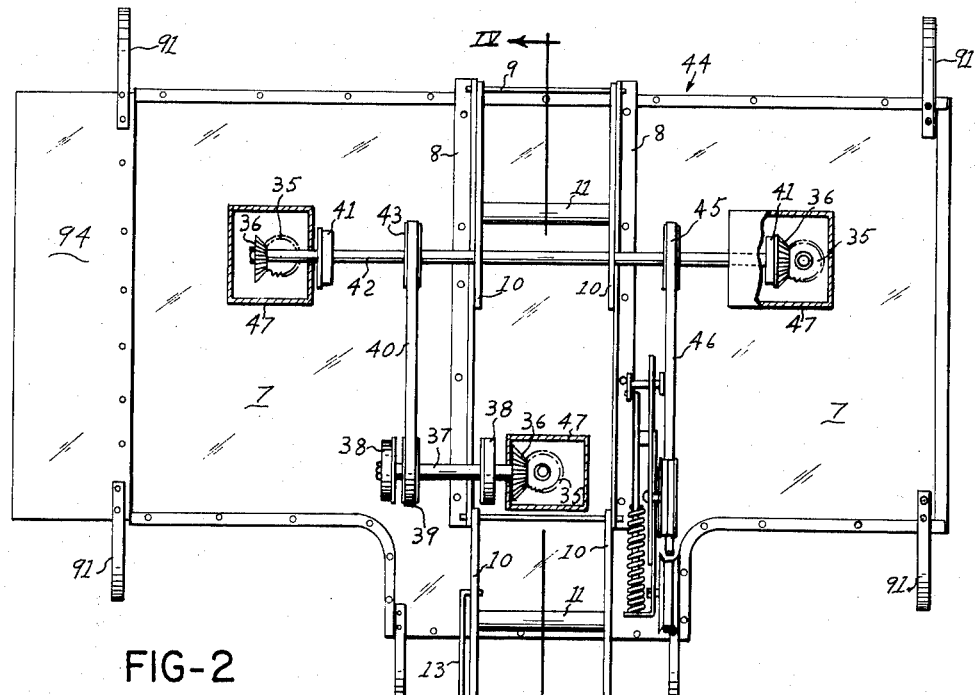
INVENTOR.
FRANK RANK
BY Toulmin & Toulmin
ATTORNEYS

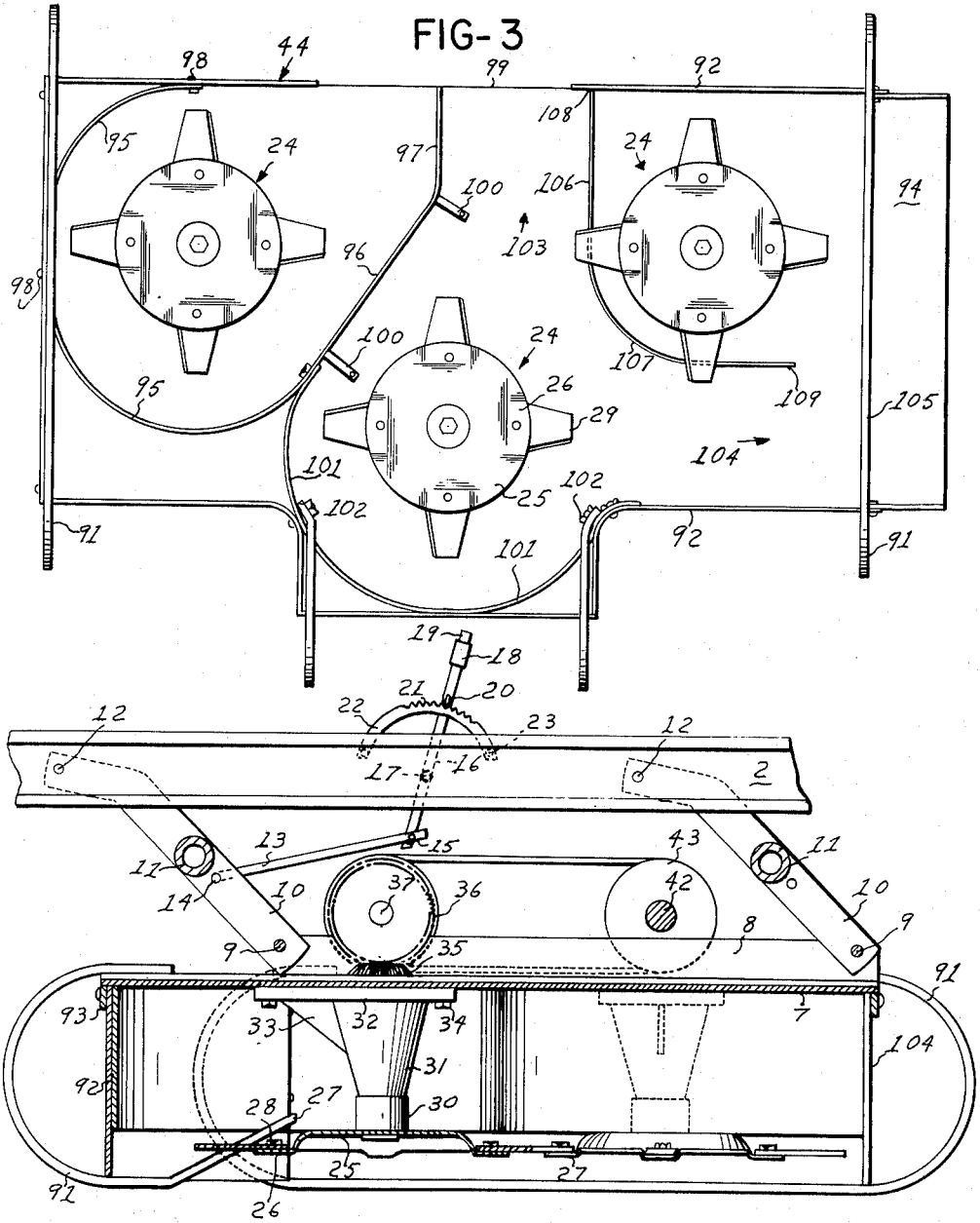

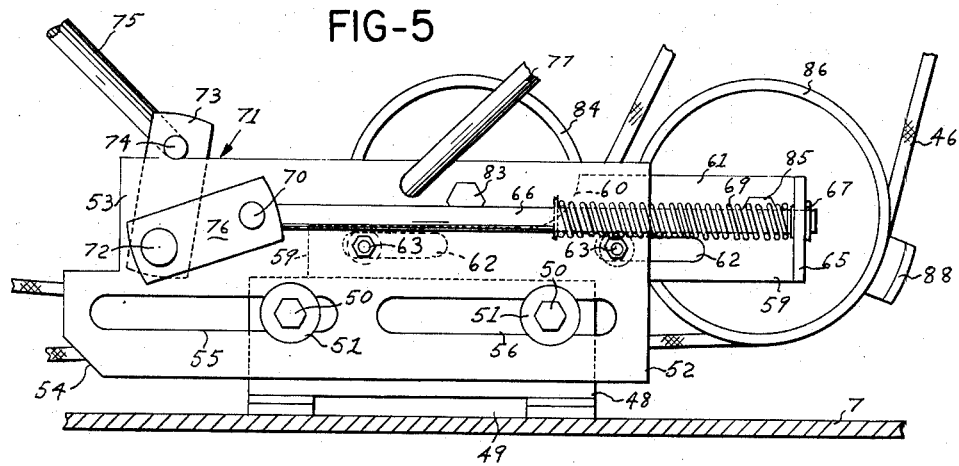

United States Patent Office 3,234,719
Patented Feb. 15, 1966

3,234,719
MULTI-CUTTER MOWER
Frank Rank, R.R. 2, Bradford, Ohio
Filed Oct. 2, 1964, Ser. No. 400,995
2 Claims. (Cl. 56—25.4)

The present invention relates to lawn mowers, particularly those of the power driven type which are suspended under a tractor or are drawn as an independent unit by a tractor from which it obtains its rotary power. These lawn mowers usually employ a bar of hardened steel with a sharpened portion at the forward cutting edge as the bar is rotated on an axis intermediate of its length. The length of the bar determines the width of the grass swath being cut, and for greater swaths, usually two bars are employed, arranged side by side, and rotating in the same direction. The cutter members are surrounded by a protective casing which projects downwardly from a metal deck with clearance allowed between the rotating cutter members and the casing. The cuttings are expelled from the cutter members through the same opening in the casing which is usually located at the rear of the mower casing.

It has been found that when the grass is tall, and particularly when wet, the volume of the cuttings becomes so great as to clog the spaces around the cutters, even as far as the exit opening. This effect puts a heavy uneven load on the cutters and may cause the mower to set up considerable vibration. In extreme cases the wedged grass may cause stalling of the cutters, particularly when the latter are belt driven, which allows slippage. The cut grass under these conditions would present a shaggy appearance, some portions short, others high, which would require a re-cutting operation.

It has been my observation, which led to the invention, that this clogging effect is not so much not having enough clearance around the individual cutting members, but rather, to the interference between the bundles of cuttings as they leave the cutter, and the resulting slowing down of the grass movement which causes the bundles to become more compact and tight and thereby increases the clogged condition.

The primary object of the invention is to provide a multi-cutter, flat bladed mower, power driven from a tractor, which will not clog up with grass but will permit the cutter to move freely with little or no vibration and regardless of the amount of cuttings passing through the mower. This object is attained in brief by controlling the directions from which the various cuttings move on their way to the exit opening in the casing and by providing the requisite number and position of the openings as to lend them to the orderly movement of the cut grass from the rotating cutters to the exterior of the mower. Barriers are provided at the proper places having predetermined curvatures with respect to each rotating cutter as to guide the cuttings into paths as will not interfere with one another. The exit openings are also increased in number and are strategically placed with respect to the various paths of the grass movement as to direct the grass from each cutter into independent streams until the grass leaves the mower.

Another aspect of my invention concerns the matter of bringing mechanical power to the cutter members, the efficiency of which also affects the tendency of preventing the cutters from stalling when the mower is under a heavy strain of cutting tall grass. The power available at the cutter members is not so much dependent upon the amount of power that is available at the tractor since the latter is usually far more than is necessary, but rather, the transfer of power from the tractor to the cutter members by way of the belts. I have found the efficacy of power transfer depends a great deal, not only on the positional relationship of the various belt lengths including the positions of the pulleys, but also as to whether or not there is any so-called "crossing" of the belt portions where they rub together and cause not only a short life of the belt but also greatly detract from the power than can be transferred from the engine or tractor pulley to each cutter member. Accordingly, another object of my invention is to provide greater efficiency in bringing the mechanical power to the cutter members, thereby preventing any undue loss of power which would tend to permit the cutter members to stall more readily when operating under a heavy grass cutting load.

In brief, this aspect of the invention provides a belt system for a tractor driven mower in which there is no cross-over effect between any of the belt lengths and the power from the tractor is delivered to the cutter members in which the various lengths of belt are spaced from one another sufficient as to cause no rubbing therebetween.

The invention will be better understood when reference is made to the following description and drawings in which:

FIGURE 1 represents a side elevational view of the improved mower unit attached to the underside of a tractor;

FIGURE 2 is an enlarged plan view of the mower unit, taken approximately at the line 2—2 in FIGURE 1;

FIGURE 3 is still a larger view of the underside of the mower unit to show the improved grass guiding barriers and the relative positions of the cutter members;

FIGURE 4 depicts a sectional view taken along line 4—4 of FIGURE 2 but again, in large size;

FIGURE 5 shows a side elevation, partly broken away, of the operating mechanism positioned on the deck plate of the mower; and FIGURE 6 is a view similar to FIGURE 5 but taken from the side opposite from FIGURE 5.

Referring more particularly to FIGURE 1, reference character 1 indicates generally the body of a tractor having a chassis frame 2, front wheels 3, rear driving wheels 4, and a steering wheel 5. The position of the operator is not shown in the figure, but he would normally sit on a spring seat directly behind the steering wheel 5. Within the body 1, there is an engine which serves through a conventional transmisison system (not shown) to drive the rear wheels 4 and also provides a power take-off pulley indicated at 6 for the mower.

The improved mower is suspended underneath the chassis frame and the mechanism is carried on a metal deck plate 7 of substantial thickness. This deck plate is provided with a pair of parallelly spaced angle plates 8, welded or bolted to the deck plate, and extending across the ends of the vertical portions of these angle plates there is a pair of rods 9 which serve as a pivot point for two sets of parallelly arranged bars or arms 10. The bars are held together but spaced apart by means of transversely extending metal tubing 11. The upper end of each pair of bars 10 is pivoted at 12 to the outside surface of the chassis frame members 2 at each side of the tractor in such a way that when a pulling force is exerted on one pair of arms near the lower pivot 9, the deck plate 7 and the apparatus associated with this plate can be caused to move upwardly, closer to the tractor since each pair of arms 10 will rotate about the pivot in parallel relation. For this purpose, there is provided a rod 13 having a hook 14 at its lower end which is inserted in an opening in one of the bars 10, this rod being pivoted at 15 to a rod 16 which is swingable about a pivot 17 on one of the chassis frame members 2..

The rod 16 extends upwardly to a hand grip 18 provided with a spring press button 19 (not shown in detail) which raises and lowers a detent 20. This detent, when lowered, pressed downwardly into a notch indicated at 21 forming part of a series of teeth in an arcuate bar 22. The latter is secured at each end as indicated at 23 in any suitable manner to the frame. Thus the operator sitting behind the wheel, upon pressing the button 19 can swing the rod 16 forwardly (i.e. away from him) which will in turn cause the forward and rear pairs of bars 10 to swing upwardly on their respective pivots 12, and this in turn, will cause the elevation of deck plate 7. On the other hand, when the rod 16 is caused to move toward the operator, the deck plate is lowered to any desired position for reasons stated hereinafter, at which time the button 19 is released, allowing the detent 20 to enter its coincident notch 21 on the arcuate bar 22 to rigidly maintain the final position of the deck plate 7.

*Cutter structure and operating mechanism*

The deck plate 7 forms the support for each of the cutter members shown generally at 24 and exemplified as being three in number (FIGURE 3). These cutter members are of the disc type as indicated at 25 and there are four equally spaced portions pressed downwardly as shown in FIGURE 4 to leave flat bearing surfaces 26 for receiving the support end 27 of the active cutter bars. The latter are held in position by means of bolts 28 passing through the depressed portions 26. These cutter bars, except for the supporting end portion, take on a general triangular shape as indicated at 29. The forward edge of each triangular portion, depending on the direction of rotation, is bevelled to give a cutting effect. It will be noted that if any one or more of these bars strikes an unyielding object, the bar will "give" to some extent by swiveling slightly about the shank of the bolt 28 and thereby avoid damage. It would then be necessary merely to tighten the bolt 28 after the bar or bars have been returned to their original position. The main or flat portion 25 of the cutter member is carried on a shaft (not shown) and supported within a bearing 30, which is held in a stationary position by means of a hollow conically-shaped support member 31 attached to a plate 32. An angular reinforcing rib 33 extends from the plate 32 to the conical member 31. The plate 32 is bolted, as indicated at 34, to the underside of the deck plate 7. There is a bearing in an opening (not shown) in the deck plate through which the shaft extends, and the latter carries a horizontally positioned bevelled gear 35 at the upper side of the deck plate. This gear meshes with a vertically disposed bevelled gear 36, the latter being carried by a shaft 37 which is supported between two vertical bearing plates 38 (FIGURE 2). The latter are secured to the top surface of the deck plate in any suitable manner. There is a pulley 39 carried on the shaft 37 for receiving a belt 40.

Also upstanding from the deck plate there is a pair of widely separated support plates 41 which furnish a bearing for a transversely extending shaft 42. A pulley 43 is mounted on the shaft 42 opposite from the pulley 39 for receiving the other end of the belt 40.

It will be understood that each of the cutter members indicated at 24 are supported from the deck plate 7 in the manner described herein and each are driven through bevelled gears of which the vertical gear of two sets of gears is carried on the shaft 42. The similar gear of the single set is carried on the shaft 37. Assuming that the rear end of the mower is indicated generally at 44 (FIGURE 3), there are two cutter members close to the rear end of the mower and one cutter member near the front end of the mower at a position midway between the two rearwardly positioned cutter members.

All of the cutter members 24 are designed to rotate in the same direction, i.e. counterclockwise as typically indicated in FIGURE 3. The shaft 42 carries a second pulley 45 for receiving the driving belt 46. Thus, as the belt 46 drives pulley 45 and its shaft 42, the gears 35 are caused to rotate to turn the two rearward cutter members. The forward cutter member is also given rotation through the pulley 43, belt 40, pulley 39, and the gears 36, 35. Since the pulleys are all of the same size and the bevel gears are alike, the cutter members 24 all rotate at the same speed.

*Belt clutch and belt tightening mechanism*

Welded to the deck plate 7 there is a short piece of angle iron or other suitably formed angle piece 48 as shown in FIGURE 6 with a part of the base portion cut away as indicated at 49. The member 48 is provided with a pair of threaded openings (not shown) for receiving the shank of bolts of which the head is indicated at 50 having a washer 51. The inside vertical surface of the angle iron 48 is planed smooth and against this surface there is held a thick plate of metal 52, of a general rectangular shape, seen more clearly in FIGURE 5, but having a cut-away portion 53 at one end and at the top, with a bevelled portion 54 at the bottom of the same end. The plate 52 is provided with a pair of slots 55, 56, closed at both ends for loosely receiving the bolts 50, for slidably clamping the plate against the angle iron piece 48. Thus, by loosening the bolts, the plate 52 is permitted to slide along the angle member 48 and still be held in a vertical position.

The upper edge of the angle member 48 is planed to a flat condition, and slidably positioned thereon, is a metal strip indicated at 59 which has the same width as measured in the vertical direction for approximately one-half the length of the strip, and there is a curved upwardly sweeping surface 60 which terminates at the uppermost edge indicated at 61 so the strip in effect has two different widths, i.e. a narrow width and a wider width at 61 interconnected by a curved surface as can be seen in FIGURE 5. The strip member 59 is provided with a pair of closed end slots 62 for loosely receiving bolts 63 provided with washers 64, these bolts being screwed into the plate 52. Thus, as the bolts 63 are loosened, the strip 59 can be slid along the top surface of the angle member 48. The strip 59 is provided at this end, i.e. the right hand end as shown in FIGURE 5, with a right angle extension or lip 65 having an opening therein for receiving a rod 66 which carries a pin 67 at a position exterior of the lip, and a second pin indicated at 68 is driven through the rod intermediate of its length. This second pin serves as an abutment for a compression spring 69 which loosely surrounds the rod and passes between the pin 68 and the lip member 65. The rod 66 is adapted to move in the right hand direction against the force of the compression spring and in so doing causes the strip 61 to slide along the upper surface of the member 48 but held in the sliding position by means of the bolts 63. The rod 66 is provided at the end opposite from the lip 65 with a right angle extension indicated at 70 which slidably fits in an opening in one leg of an angular bar lever, indicated generally at 71, which is pivoted at 72 in the heavy plate 52 near the position of the cut-out portion 53. This pivot actually constitutes a shaft which extends through the member and carries at its opposite side the other leg 73 of the angular lever which may constitute a bar element. The leg 73 has an opening 74 therein for receiving the hook terminus of a clutch control rod 75. Thus, as the control rod is pushed downwardly, as seen in FIGURE 5, the pivot shaft 72 is rotated, to cause the other leg 76 of the lever to move clockwise and to push the rod 66 to the right by which the strip member 59 is caused also to move to the right in the manner and for the purpose already explained.

There is also a "permanent adjustment" rod 77 having a hook end (not shown) which swivelly fits into an opening in the plate member 52 for the purpose of slidably moving this member with respect to the flat vertical surface of the angle iron 48 which is clamped by the bolt 50. This rod 77, as seen in FIGURE 6, extends angularly upwardly and passes through the lip portion 78 of a lug 79 which is riveted as at 80 or otherwise pivotally secured to a frame member of the tractor. The rod is threaded, as indicated at 81, and nuts 82 are provided on each side of the lip so that the length of the rod can be adjusted with respect to the stationary lug.

The metal plate 52 is provided with a bearing indicated as a bolt head 83 for a shallow grooved pulley 84. The metal strip 59 is provided similarly with a bearing indicated as a bolt head 85 for a deep grooved pulley 86.

As seen more clearly in FIGURES 1 and 2, a belt 46 is taken from around the engine pulley 6 of the tractor to the underside of the pulley 84, then over the top of the pulley 45, then around the pulley to the underside of the pulley 86 back to the engine pulley 6. As pointed out hereinbefore, when the pulley 6 of the tractor is turned, power is transmitted to the pulley 45 by the belt 46 which in turn causes the shaft 42 to rotate, thereby rotating the vertically disposed beveled gears 36, and power is furnished to the pulley 43 for turning the pulley 39 and its shaft 37 by which the vertically disposed beveled gear at the front end of the mower is operated. These gears then cause the cutter members 24 to rotate in the counter clockwise direction as seen in FIGURE 3. Belt straps 88 of a well-known type can be provided at the position of the pulleys 84, 86, for holding the belts within the grooves of the pulleys. In applying belt 46 it is desirable that the forward pulley 86 be moved as close to the pulley 84 as possible and thus allow the belt to be fairly loose and this is done by pulling up on the lever 75 which will cause the metal strip 59 to move toward the plate 52 and thus reduce the distance between the pulley bearings indicated at 85, 83, after which the rod 75 can be pushed downwardly to separate the bearings and thus tighten the belt.

It is obvious that the rod 75 in effect constitutes a clutch lever in that when it is pressed downwardly the belt is allowed to slip and no power is transmitted to the shafts 42, 37 and the cutter members remain stationary. For convenience, this clutch lever can be extended upwardly to pass through a suitably positioned bearing 89, and terminating in a knob 90 in a forward position to be grasped by the operator of the combined tractor-mower. However, if after continuous use it is found that there is undue slippage at the belt, due perhaps to stretching by wear, so that the cutters members are not rotating at their proper speed, the nuts 82 on the rod 77 are adjusted to move the plate 52 with respect to the member 48 (after loosening the bolts 50) which in effect causes the pulleys 84, 86 to move as a unit, and therefore the same distance away from the pulley 45 (FIGURES 5 and 2). When the proper tightening effect is effected on the belt, the adjustment at the nuts 82 is discontinued and this new position for each of the pulleys 84, 86 will become permanent.

Thus there is provided herein the mechanism, not only for giving a permanent tightening of the belt 46 in order to maintain the proper speed of the cutter members but also a mechanism for clutching and de-clutching the pulley 45 from the continuous rotation effect of the engine pulley 6 when it is desired to stop the cutter members. The clutching and de-clutching mechanism is in ready reach of the operator sitting on the tractor, as is also the mower elevating and lowering mechanism effected by operating the lever 16 and the detent 20 acting on the arcuate strip 22.

If desired, the usual curved guard members 91 can be applied to the rear and front edges of the mower for protection purposes. As shown on the drawings, the improved mower is also provided with a downwardly extending flange 92 which extends about the entire periphery of the deck plate 7 to which it is attached by an overhanging lip 93. This flange extends downwardly to a position a short distance below the position of the cutter members 24. However, as will be explained hereinafter, the flange member is open at the various grass exit openings. A plate 94 can be riveted to the deck plate as indicated in FIGURE 2, and positioned directly over the grass exit openings on which to rest the foot if desired and to prevent the grass cuttings from blowing upwardly.

*Baffle arrangement*

When a mower of the type described is being used for cutting heavy stalked grass, tall grass or even short wet grass, it has been found that the grass cuttings tend to form bundles or balls within the flanged interior of the mower. The fresh cuttings in moving toward the exit openings in the flange have to push these bundles away, and this causes a clogging of the grass stream as it moves from the interior to the exterior of the mower. In general, the taller or the heavier stalked grass will cause a tight binding or twisting effect on these bundles and the latter set up a formidable obstruction to the orderly movement of the grass as it is cut. In extreme cases, these compact masses will wrap themselves around the cutters and may cause the latter to stall or at least to reduce their speed below that necessary efficiently to cut the grass due to the slippage of the belts. My invention contemplates a change in the construction of the areas immediately surrounding the cuttter members in such a way that the grass cuttings are guided into their own paths of movement which are constrained away from the paths taken by the remaining portion of the grass. Consequently, free and uninterrupted movement of the grass is permitted from the position of each cutter member to the exterior of the mower through the various exit openings. Accordingly, I provide a baffle barrier 95 (FIGURE 3), which in the case of the cutter member to the left and rear of the mower, forms a semi-circular configuration and then proceeds on a straight diagonal path, indicated at 96, to a position indicated at 97 which leads directly to the rear of the mower. This baffle may be made of sheet metal and is bolted, as indicated at 98, to the flange 92 of the mower. It has a depth somewhat less than the depth of the flange 92 so as to leave the lower edge somewhat above the position of the cutter members 24. The portion 97 of the baffle preferably bisects a large rear opening 99 in the flange so that grass cut by the left rear cutter member (as seen in FIGURE 3) would be guided by the curved surfaces of the baffles 95, 96, 97, to find an exit through the left hand portion of the large rear exit opening 99 provided at the flange. These grass cuttings cannot flow over toward either of the two remaining cutter members. If desired reinforcing ribs 100 riveted to the underside of the deck plate may be used to maintain the baffle portions 96, 97 in a vertical position since considerable strain may be exercised at these portions by the flowing grass stream.

Likewise, the curved baffle 101 similar to the baffle 95, and made of sheet metal is bolted, as indicated at 102, to the flange 92 where the latter makes a sharp turn in conforming to the shape of the deck plate. The grass cuttings, assuming this member to be rotating in a counter-clockwise direction, will flow partly in the direction indicated by the arrow 103 and partly in the channel indicated by the arrow 104. The latter leads to a large side exit opening in the flange indicated at 105 directly under the plate 94. A correspondingly similar baffle 106 takes the general form of a right angle member but with a large curve as indicated at 107 which surrounds the upper right hand cutter member. This baffle is secured to the flange at the position 108 along the edge of the large rear opening 99 and the other end stops short, as indicated at 109, of the exit opening 105.

Due to the effect of the baffle lengths 106, 107, practically all of the grass cuttings from the righ rear cutter member will be guided so as to pass directly through the portion of the side opening 105 which is in juxtaposition to the cutter member. Thus each of the cutter members have their own passageway for the grass cuttings—the left hand rear cutter propels the grass cuttings to flow through the left hand half of the rear opening 99, the front center cutter member will have a split channel effect indicated at 103 and 104, part passing through the right hand half of the rear opening 99 and part passing through the forward portion of the side opening 105. The third cutter member will have its own passageway for the cuttings which move through the rear portion of the side opening 105. None of these passageways interfere with one another and the curved character of the baffles permits the grass cuttings in all three passageways to flow through the mower at the rear and side openings in such a way that there is little or no interference between the streams of grass cuttings in case the cuttings represent long tough grass or even wet grass. Due to this lack of interference there is no tendency of the grass to form bundles or balls or to twist together, and each length of grass will flow in an orderly fashion through the adequate smooth walled channels and out through the side and rear exit openings.

As shown in the drawings, the baffles 106, 107, are of a depth so as to stop short of the cutter members, but the baffles 95, 101, may be of greater depth since they do not have to stay clear of the cutter members as long as these baffles stop short of the lower edge of the flange 92.

It is obvious that the horizontal position of the cutter members with respect to the ground, and thus the height of the grass cutting position, may be regulated by simply raising and lowering the mower unit at the hand operated level 16 which moves the unit in an upward diagonal direction through the parallelly positioned pairs of arms 10. The speed of the cutter members may be controlled by regulating the pulley take-off speed at 6 which in turn is a function of the speed of the tractor engine.

*Belt arrangement*

A study of the position of the pulleys 6, 86, 84, and 45, in FIGURES 1 and 2, and the manner of interconnecting these pulleys by means of a single belt 46, will show that the latter has no "cross-over" points, or at any place where the belt lengths come so close together as to cause interference between the lengths of the belt. Moreover, the outside surface of this driving belt never reverses its position as far as the driving pulleys are concerned, i.e. the belt always remains with the exterior surface on the outside of the pulleys 6, 86, and 45, so that a belt of triangular cross section having considerable gripping effect, can be used. If desired, the pulley 84 may have a shallow groove since it performs the function of an idler, whereas the pulley 86 should preferably have a deep groove since it controls the clutching and declutching connection with the power take-off in response to the movement of the rod 75.

From the foregoing, it is evident that I have disclosed a multi-cutter mower in which the cutter members are provided with their own individual passageways for the grass cuttings in order to prevent interference between the various streams of grass cuttings as they leave the cutter members. The mower under these conditions works much more efficiently than if the grass cuttings were allowed to find their own way through the mower to the exit openings where they tend to twist or bundle together and eventually form real obstructions to the orderly or continuous flow of the grass that is being continuously cut by the cutter members. In addition, the power belting system has been devised in such a way that there is no reversal of the belt or any cross over between belt lengths as might give rise to friction and cause reduced efficiency in bringing the power available at the tractor to the cutter members.

It will be understood that this invention is susceptible to modification in order to adapt it to different usages and conditions; and accordingly, it is desired to comprehend such modifications within this invention as may fall within the scope of the appended claims.

I claim:
1. A multi-bladed grass mower including a deck plate for supporting the operating mechanism of the mower, at least three cutter members suspended from said deck plate and adapted to be rotated in unison by said mechanism in order to cut grass, two of said cutter members being positioned at the rear of the mower and spaced widely apart, the third cutter member being positioned at the forward end of the mower out of line with the other two members, but centrally located with respect thereto, a flange member extending downwardly from the edges of said deck plate and having a grass-exit opening at the middle of the rear portion of said flange member and another grass-exit opening at the side portion of said flange member, means comprising barriers suspended from the deck plate and individually surrounding each cutter member for guiding the cut grass from one of said rearward cutter members through approximately one-half of the rear exit opening, also for guiding grass cut by the other of said rearward cutter members toward a portion of the said side exit opening, and for guiding grass cut by the forward cutter member to flow partly through the other one-half of said rearward opening and through another portion of the side opening.

2. A multi-bladed mower unit adapted to be attached to the underside of a tractor, said unit including a deck plate for supporting the operating mechanism for the unit of which the operating power is derived from the tractor, at least three cutter members suspended from the underside of said plate and adapted to be rotated by said mechanism in order to cut grass, said plate being of substantially rectangular shape, a flange member extending downwardly from the edges of said plate to a position below the cutter members, grass-exit openings along the rear and side portions of said flange member, barriers supported from the underside of said plate for controlling the flow of cut grass from the cutter members and spaced therefrom as to facilitate the flow of grass cuttings from each of the cutter members to said exit openings, two of the cutter members being positioned within the corners defined by the rear and side edges of said plate and the third cutter member being positioned intermediate of said side edges and near the front edge of said plate, the rear of said grass-exit openings being bisected by one of the barriers as to permit the cuttings of one of said corner-located cutter members to be expelled through one portion of the bisected opening, another of said barriers serving to permit part of the cuttings of the forwardly positioned cutter to be expelled through the other portion of said bisected opening, the remaining part of the cuttings of said last mentioned cutter member being forced by its surrounding barrier to be expelled through a part of the side opening in the flange, and the other of said corner-located cutter members being forced by its barrier to expel its cuttings through the remaining part of the side exit opening whereby each stream of grass cuttings from the respective cutter members are kept separate of one another.

References Cited by the Examiner

UNITED STATES PATENTS

| | | | |
|---|---|---|---|
| 2,815,634 | 12/1957 | Bush | 56—25.4 |
| 2,862,343 | 12/1958 | Wood | 56—25.4 |
| 2,991,612 | 7/1961 | Holmes | 56—25.4 |
| 3,077,065 | 2/1963 | Samways et al. | 56—25.4 |
| 3,080,696 | 3/1963 | Wood | 56—25.4 |
| 3,107,472 | 10/1963 | Witt et al. | 56—25.4 |
| 3,157,014 | 11/1964 | Bottenberg | 56—6 |
| 3,166,880 | 1/1965 | Robinson | 56—6 |

ABRAHAM G. STONE, *Primary Examiner.*

M. C. PAYDEN, *Assistant Examiner.*